United States Patent [19]

Melin, Jr. et al.

[11] 4,000,991
[45] Jan. 4, 1977

[54] METHOD OF REMOVING FLY ASH PARTICULATES FROM FLUE GASES IN A CLOSED-LOOP WET SCRUBBING SYSTEM

[75] Inventors: Deering D. Melin, Jr., Palo Alto; Donald F. Grieve, La Honda, both of Calif.

[73] Assignee: Krebs Engineers, Menlo Park, Calif.

[22] Filed: Dec. 5, 1975

[21] Appl. No.: 638,182

Related U.S. Application Data

[63] Continuation-in-part of Ser. No. 562,553, March 27, 1975, abandoned.

[52] U.S. Cl. .................................. 55/48; 55/73; 55/85; 210/45
[51] Int. Cl.² .................................. B01D 47/06
[58] Field of Search ............ 55/48, 73, 85; 210/45

[56] References Cited

UNITED STATES PATENTS

| | | | |
|---|---|---|---|
| 3,503,185 | 3/1970 | Delzenne et al. | 55/73 |
| 3,753,900 | 8/1973 | Moore | 210/45 |
| 3,798,309 | 3/1974 | Knowles | 55/73 X |
| 3,864,485 | 2/1975 | Hoasley | 55/73 X |

*Primary Examiner*—John Adee
*Attorney, Agent, or Firm*—Flehr, Hohbach, Test, Albritton & Herbert

[57] ABSTRACT

A method of removing fly ash particulates suspended in industrial waste gases generated from the combustion of fossil fuels in a totally enclosed scrubbing liquor circuit whereby an inert diluent such as $Na_2SO_4$ is used for inhibiting the dissolution rates of the alkaline earth, silica, and clay mineral ingredients in the ash when the collected particulates are intermixed and suspended in weak acid solutions produced in the wet scrubbing process. The diluent may be added to the system or, if the waste gas contains significant amounts of sulfur oxides, it may be formed in situ.

14 Claims, 3 Drawing Figures

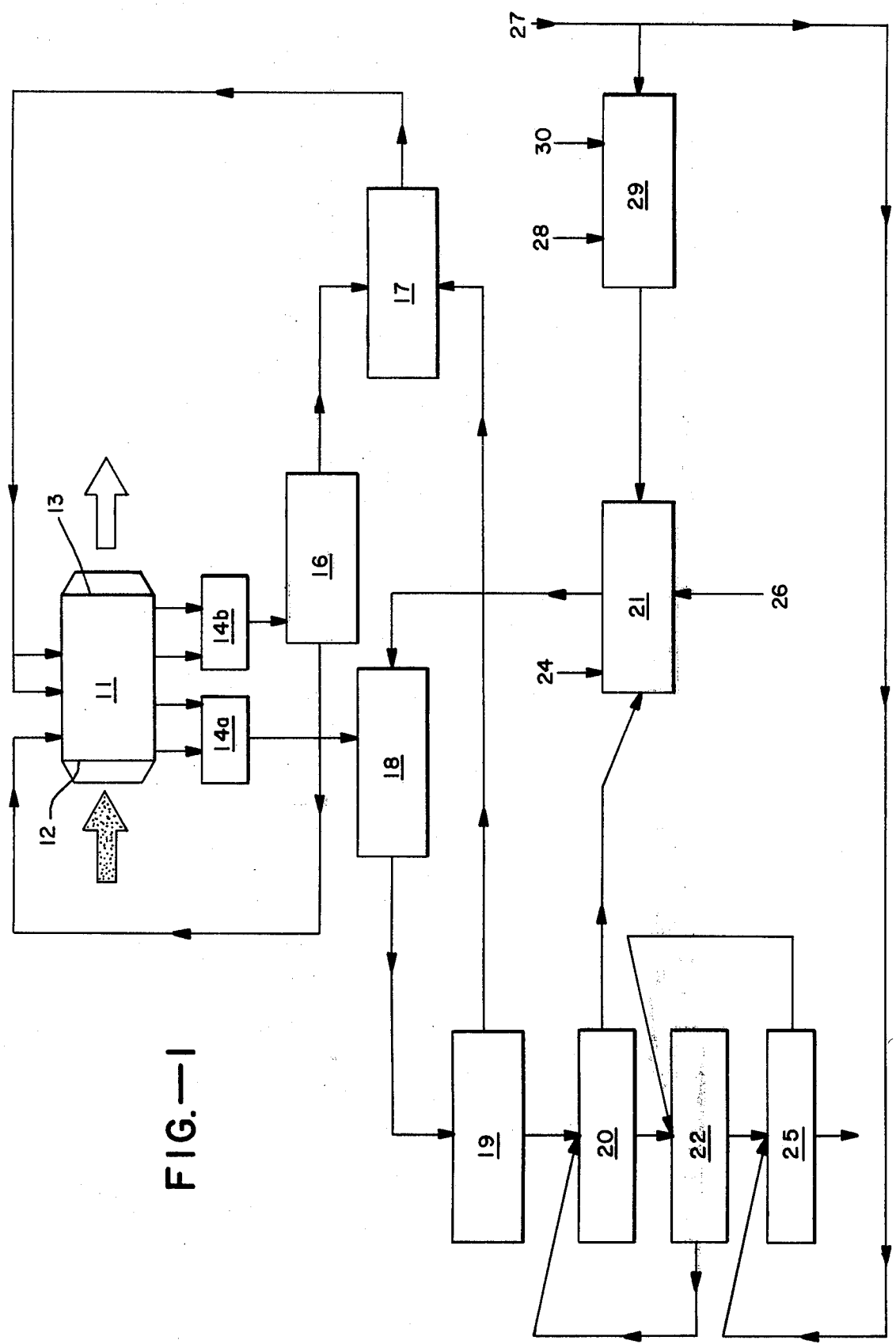
FIG.—1

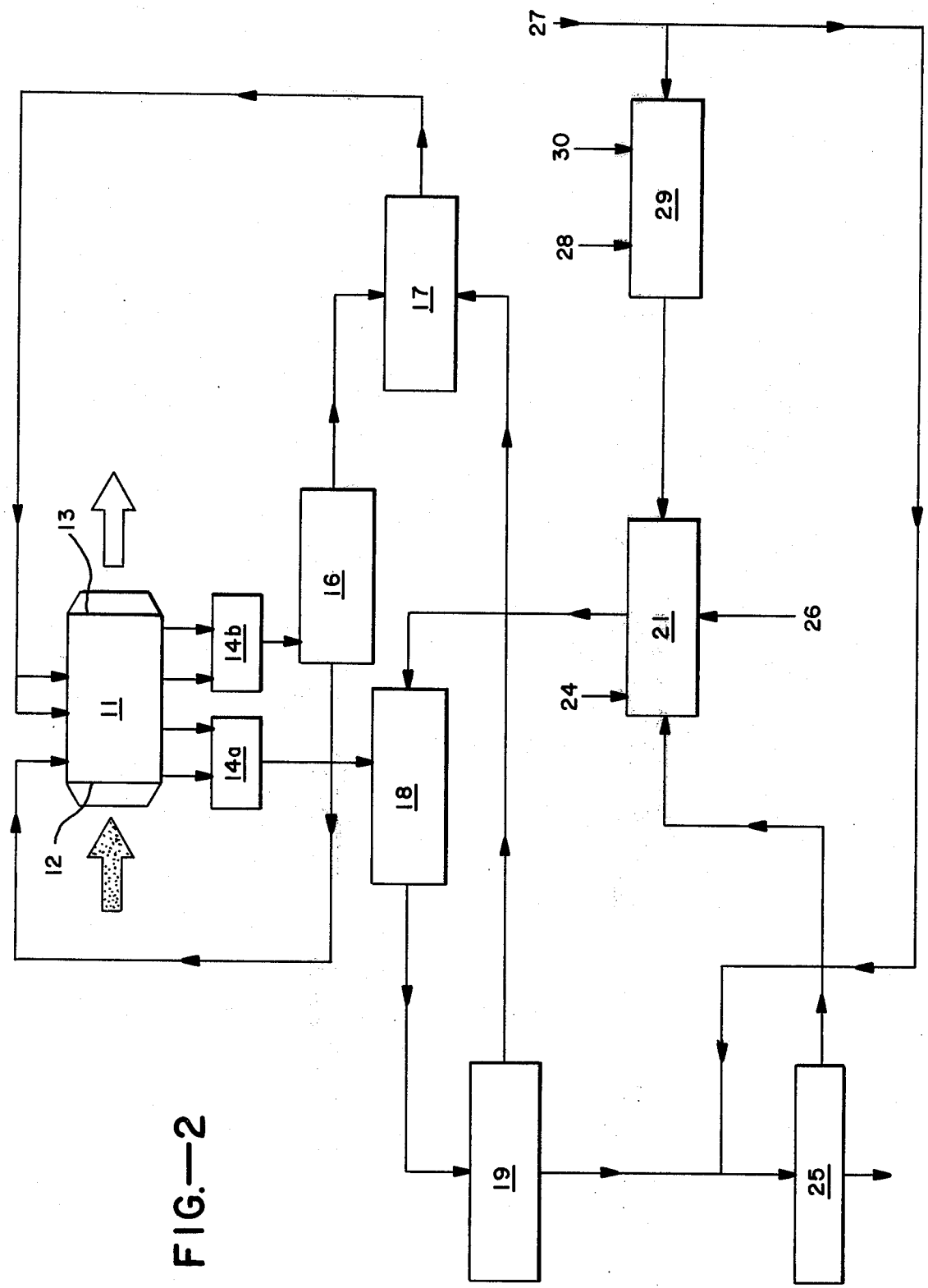
FIG.—2

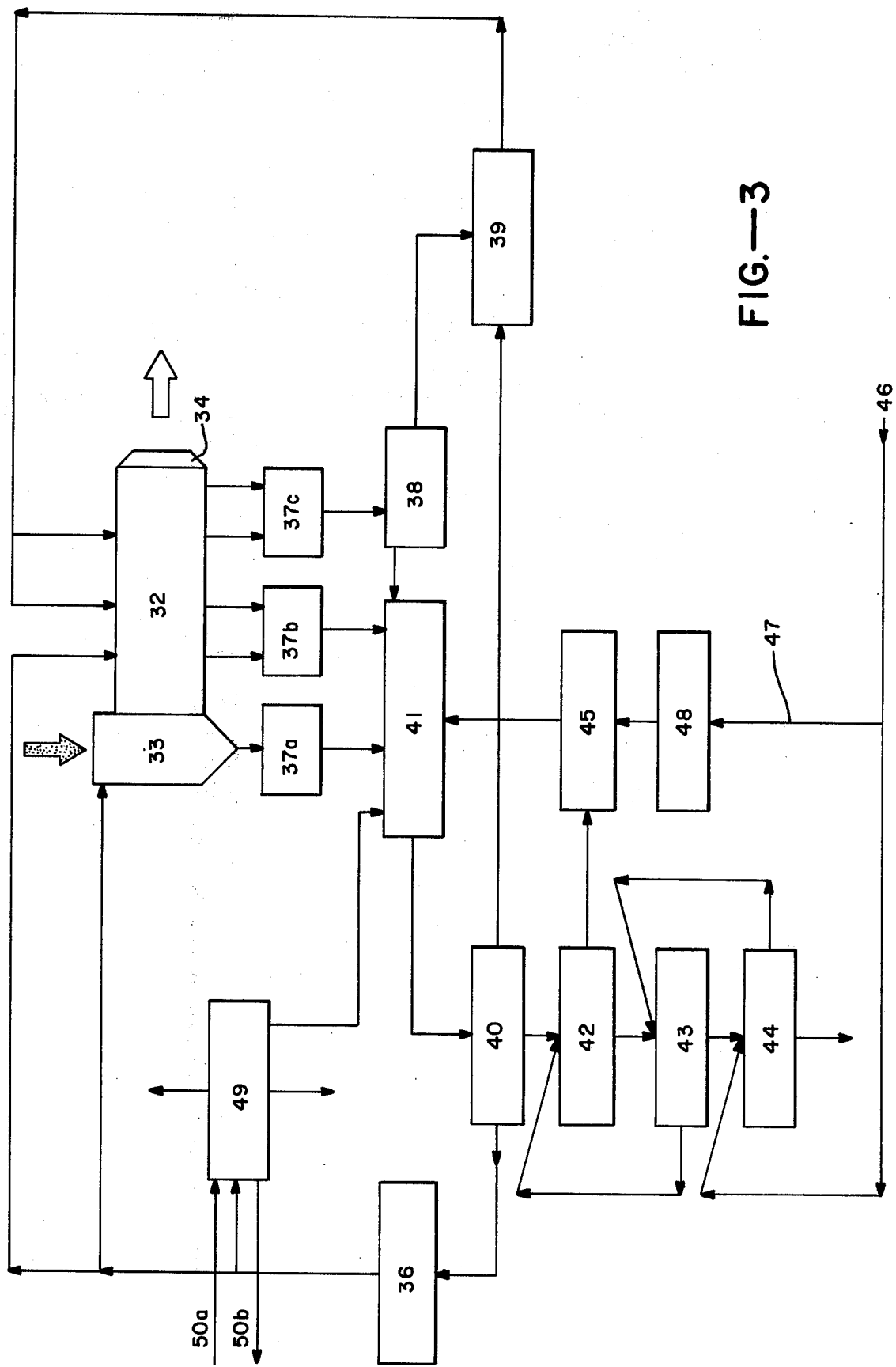
FIG.—3

METHOD OF REMOVING FLY ASH PARTICULATES FROM FLUE GASES IN A CLOSED-LOOP WET SCRUBBING SYSTEM

CROSS-REFERENCE TO RELATED APPLICATION

This application is a continuation-in-part of our co-pending application Ser. No. 562,553, filed Mar. 27, 1975 now abandoned, entitled "A Method of Removing Fly Ash Particulates from Flue Gases in a Closed-Loop Wet Scrubbing System".

BACKGROUND OF THE INVENTION

Proponents of dry collection systems contend that the use of wet scrubbers for conditioning and cleaning pulverized coal fired steam generator flue gases merely converts an air pollution problem into a potential water pollution problem. As a result, the disposal of the fly ash fraction collected in the scrubber along with the treatment of the scrubbing liquor inventory are important considerations when designing a wet collection system for a given application.

Since environmental regulations prohibit indiscriminate contamination of wall water courses with suspended or dissolved solids contained in wet scrubber effluents, it is imperative that all scrubbers are designed to operate as near as possible within the parameters of a totally enclosed or "closed-loop" system. Enforcement of these regulations will contribute to an eventual abandonment of "once-through" scrubbing water circuits in favor of a "closed-loop" mode of operation. Before this can be accomplished, however, a more effective method of controlling the quantity and quality of the system blowdown liquors must be perfected.

In order to achieve a "closed-loop" mode of operation, the scrubbing liquor bleed-off or blowdown rate, apart from the dissolved solids removed from the system in the evaporator circuit, is limited essentially by the quantity of dissolved solids rejected from the system as mechanically entrained liquor in the ash pond or filter cake residue. Discounting the dissolved solids rejected from the system in the form of a chemical precipitate, the resulting blowdown rate is a function of the dissolved solids carrying capacity of the recycled scrubbing liquor. This, in turn, is influenced by the chemical content of the ash collected in the scrubber and by the solubility rates of the alkaline earth, silica and clay minerals present when the ash is intermixed and suspended in weak acid solutions formed in the scrubbing process. Experience has shown that approximately 20% of the sulfuric acid mist and $SO_2$ contaminants in the flue gases will be absorbed in aqueous scrubbing solutions without additions of any chemical absorbents.

The findings of a recent water balance survey performed at an existing power plant scrubber installation indicated that a liquor blowdown rate equivalent to 12.57% of the total scrubbing liquor inventory was required in order to insure prolonged trouble-free scrubber operations. By controlling the pH of the scrubber effluent between 4.3 and 4.5, the total dissolved solids in the scrubbing liquor at steady state conditions exceeded concentrations of 4000 ppm with corresponding calcium hardness levels in the region of 2000 ppm as $CaCO_3$. Any attempt to operate below the blowdown rate indicated above or at pH or dissolved solids levels in excess of these values, produced instantaneous scaling throughout the scrubbing liquor circuit with the most prevalent scaling occuring in the wet-dry zone area of the scrubbers. Of more significance, the 12.57% liquor blowdown rate reported is excessive by most standards and confirmed the need for tightening the scrubbing liquor circuit. In order to accomplish this and still function within the realm of existing governmental codes, the above stated dissolved solids and calcium hardness levels would have to be increased nearly twenty-fold. It is apparent that a feasible post chemical treatment method would be required for maintaining solids concentrations in the scrubbing liquor well below the levels required in a "closed-loop" mode of operation. Otherwise, severe operating problems would result from solids crystallizing out of suspension to form extremely hard-to-remove scale deposits in the scrubber proper.

SUMMARY OF THE INVENTION AND OBJECTS

An objective of this invention is to provide a method of removing fly ash particulate matter suspended in industrial waste gas streams generated by the combustion of fossil fuels in an essentially closed-loop wet scrubbing system to an extent where the scrubbing liquor blowdown rate can be maintained at a level consistent with environmental standards.

A second objective of this invention is to maintain the total dissolved solids and calcium hardness levels throughout the scrubbing liquor circuit at concentrations well within the operating parameters of the wet scrubbing system by impeding the dissolution rates of the scale-producing alkaline earth, silica and clay minerals present in the fly ash in a pH controlled environment.

Another objective of this invention is to treat a portion of the scrubbing liquor chemically in order to achieve significant concentration reductions of such residual scale-producing calcium-base compounds in solution as $Ca(OH)_2$, $CaSO_3$ or $CaSO_4$, by selectively precipitating these compounds in the form of a free settling and rapid filtering insoluble $CaCO_3$ salt.

The above objectives are accomplished by the addition of an inert diluent, such as sodium sulfate or other soluble metal salt, to the scrubbing liquor inventory in order to impede the dissolution rate of the scale-producing alkaline earth, silica and clay mineral ingredients in the ash when suspended in a scrubber effluent liquor maintained at pH levels of not less than 6.0. Alternatively, if the waste gas contains significant quantities of sulfur oxide compounds, the inert diluent may be formed in situ by adding a source of sodium ion.

Additional objectives and features of the invention will emerge from the following description of the preferred embodiments which have been set forth in detail in conjunction with the accompanying drawings.

BRIEF DESCRIPTION OF THE DRAWINGS

FIGS. 1, 2 and 3 schematically illustrate three distinct and complete apparatuses or systems for carrying out the process of the invention.

DETAILED DESCRIPTION OF THE PREFERRED EMBODIMENTS

The apparatus illustrated in FIG. 1 includes a multiple stage scrubber 11 having a gas inlet transition 12 and a gas outlet transition 13. Typically, the inlet transition 12 is connected to the discharge side of a forced draft fan, or, alternatively, the outlet transition 13 is connected to the intake side of an induced draft fan, whereby the gas passes through scrubber 11 at a substantially predetermined and controlled velocity. While various types of scrubbers may be employed, it is preferable to use a scrubber of the spray type, such as disclosed in U.S. Pat. No. 3,036,417. This type of scrubber is conducive to performing efficiently at low pressure drops and relatively low liquid to gas ratios. The gas supplied to the inlet transition 12 contains suspended fly ash in significant quantities and is typical of flue gas emissions from a pulverized coal fired steam electric generator having a capacity of 478 MW.

The present invention involves the use of a scrubbing liquor containing a soluble alkali metal salt as an inert diluent with an anion unreactive with the sulfur oxides in the gas stream while maintaining the pH level in the scrubber effluent liquor stream near the neutral or slightly basic range (i.e., 6.0 or more). This combination of conditions will substantially impede the dissolution rates of the alkaline earth, silica and clay minerals present in the fly ash. Because of availability and cost considerations, sodium sulfate is the preferred compound for this purpose and the present description will refer to the compound. However, it should be understood that other salts having similar properties may be employed or formed during the scrubbing process. Although operable, other metal salts (e.g., salts of potassium, lithium or magnesium) are relatively expensive. By the same token, other common anions, such as chlorides, can result in chloride stress cracking corrosion problems in the system components. The remainder of the apparatus will now be described before setting forth the details of the process.

Untreated and unsaturated gases entering the scrubber inlet transition or prequench zone 12 are prehumidified and reduced to adiabatic saturation temperature levels in the scrubber prequench zone using prequench liquor supplied from the recycle liquor tank 16. The scrubber effluent comprised of scrubbing liquor and entrained fly ash discharges into seal tanks 14a and 14b. The effluent from the seal tank 14b is delivered to the recycle liquor tank 16 where a portion of the liquor is recycled to the scrubber inlet transition zone 12. The balance of the liquid in the recycle liquor tank 16 is diverted to the main spray liquor tank 17 and combined with the make-up liquor supplied from primary clarifier 19 as described below prior to being recycled to the main spray zone in the scrubber 11.

The scrubber effluent from seal tank 14a is diverted to the effluent disposal tank 18 and combined with chemically treated CCD thickener overflow liquor prior to being distributed to primary clarifier 19, whereupon a primary solids-liquid separation occurs. The overflow liquor from primary clarifier 19 is recycled to the main spray liquor tank 17 as make-up liquor for the scrubber.

The underflow from primary clarifier 19, containing partially dewatered fly ash and liquor, is directed to a first stage countercurrent decantation (CCD) washing thickener 20 for additional concentration of the solids fraction and displacement of the mechanically entrained liquor in a weaker concentration of scrubbing liquor from the succeeding stage washing thickener. The overflow from thickener 20 is directed to an alkali mix tank 21 where any residual calcium ions produced in the process are removed from the system by chemical precipitation. The underflow from thickener 20 is advanced to the second stage CCD washing thickener 22. More effective thickening of the fly ash is effectively accomplished in this manner and the insoluble fly ash residue is displaced in progressively weaker concentrations of washing solution. The underflow from the second stage CCD thickener 22 is combined with any make-up water additions to the system and the mixture transferred to the ash pond 23, or alternatively, if the space is too limited for an ash pond, to an ash filtration station. The overflow from the ash pond or filtrate from the ash filtration station is recycled to the second stage thickener 22 leaving a deposit of ash pond and filter cake residue, chemical precipitate, and mechanically entrained liquor, the latter of which constitutes system blowdown liquor.

In alkali mix tank 22, a portion of the residual calcium ions remaining in solution are precipitated and the pH level in the tank adjusted accordingly by additions of a suitable alkali such as caustic soda or soda ash. One technique for precipitating the calcium ions is to supply carbon dioxide from a source 24, suitably flue gas, to carbonate and precipitate the calcium ions as calcium carbonate. Another effective, but more expensive, technique for precipitating the calcium ions is by the additions of soda ash from source 26 to form an insoluble calcium carbonate precipitate.

Make-up water from source 27 and an alkali such as sodium hydroxide from a second source 28 are supplied in appropriate quantities to alkali storage tank 29 along with the sodium sulfate diluent make-up requirements from source 30 to provide a suitable basic solution for raising the pH in the alkali mix tank 21 to the desired level. The resulting basic liquor from alkali mix tank 21 is then returned via the effluent disposal tank 18 for combining with the scrubber effluent liquor prior to feeding the primary clarifier 19. This step in the process accomplishes two functions, namely, (1) the pH of the scrubber effluent is adjusted according to the acidic compounds formed in the scrubber, and (2) the fly ash particles in suspension act as nuclei or seeds for agglomerating the finely dispersed calcium carbonate flocs formed in the alkali mix tank 21. These seeding phenomena produce a better settling agglomerated floc in the primary clarifier 19 and reduce the losses of valuable chemicals from the system.

Operation of the apparatus described above and the manner in which the present process is carried out is as follows. The gas stream containing fly ash and other gaseous contaminants enters a multi-stage scrubber 11 through the inlet transition 12 where it is prehumidified and reduced to adiabatic saturation temperature levels prior to entering the main spray section of the scrubber. An inert diluent such as sodium sulfate is either added to the aqueous scrubbing liquor or formed in the normal scrubbing process to impede the dissolution of the scale-producing alkaline earth, silica and clay minerals in the fly ash. Rapid dissolution of these minerals would occur otherwise, since a portion of the sulfur oxides in the flue gases would be absorbed by the aqueous scrubbing solution to form weak sulfuric and sulfurous acids. Unimpeded, these acids would in turn leach out a portion of the calcium and magnesium ingredients in the fly ash in accordance with the following equations:

$$CaO + H_2SO_3 \rightleftharpoons CaSO_3 + H_2O \qquad (1)$$

$$CaO + H_2SO_4 \rightleftharpoons CaSO_4 + H_2O \qquad (2)$$

$$MgO + H_2SO_3 \rightleftharpoons MgSO_3 + H_2O \qquad (3)$$

$$MgO + H_2SO_4 \rightleftharpoons MgSO_4 + H_2O \qquad (4)$$

It has been found that in the presence of an inert diluent such as sodium sulfate in the scrubbing zone at a pH maintained between 6.0 and 8.0, the dissolution rates of the scale-producing constituents in the ash by the leaching action of the scrubbing solution are depressed to a point where chemical treatment of any dissolved calcium, silica or alumina contaminants is economically feasible without violating the conditions required for a "closed-loop" mode of operation. Concentrations of the sodium sulfate diluent may be varied between 0.1% and 30.0% by weight of the scrubbing solution, however, concentrations will be maintained in most applications between 1.0% and 10.0% by weight. The sodium sulfate is recycled continuously and any loss of diluent in the ash pond or filter cake residue is replenished by equivalent additions of sodium sulfate make-up via the alkali storage tank 29.

The scrubbing liquor bleed-off or blowdown rate in a continuous system, defined as a percentage of the scrubbing liquor inventory rejected from the system as ash pond or filter cake residue, may be limited to 0.2% to 2.0% or less. In the examples cited in FIGS. 1 and 2, losses in sodium-base chemicals are limited to 0.5 and 6.25 TPD respectively as $Na_2SO_4$ by recycling ash pond supernatant liquor or filtrate from an ash filtration station back through the CCD washing thickeners and primary clarifier in FIG. 1 countercurrent to the advancing solids fraction and through the primary clarifier system only in FIG. 2.

Referring again to the overall system, complete or partial removal of any residual calcium ions dissolved in the scrubbing liquor is accomplished in the alkali mix tank 21. Normally, the calcium ions are associated with sulfite and sulfate anions in most fly ash scrubbing operations and their removal from the system can be accomplished by exposing a portion of the recycled scrubbing liquor inventory to flue gases containing carbon dioxide. Under these conditions, the following equations apply:

$$CaSO_3 + CO_2 + H_2O = CaCO_3 \downarrow + H_2SO_3 \qquad (5)$$

$$CaSO_4 + CO_2 + H_2O = CaCO_3 \downarrow + H_2SO_4 \qquad (6)$$

Similarly, if precipitation of the calcium ions is to be performed by supplementary chemical additions to the system, this may be accomplished in the following equations using soda ash as the reactant:

$$CaSO_3 + Na_2CO_3 = CaCO_3 \downarrow + Na_2SO_3 \qquad (7)$$

$$CaSO_4 + Na_2CO_3 = CaCO_3 \downarrow + Na_2SO_4 \qquad (8)$$

To summarize, the purpose in treating a portion of the scrubbing liquor chemically is to reduce the concentrations of any residual scale-producing calcium ions in solution, typically in the form of sulfite or sulfate salts, by selectively precipitating these salts as an insoluble calcium carbonate compound.

As described above and defined in Example 1, FIG. 1 depicts a flow diagram of a typical system or process involving the use of countercurrent decantation washing thickeners. This process is generally reserved for larger capacity scrubber installations where chemical losses must be limited by economic necessity. A more simplified version of the system and process depicted in FIG. 1 is described in FIG. 2 and in Example 2 in which the CCD washing thickeners are eliminated entirely as a capital saving measure. This process is generally appropriate for smaller capacity scrubber installations where chemical cost considerations are rather insignificant.

In the foregoing embodiments, the inert diluent sodium sulfate, is added to the system in a make-up stream. In an alternative procedure, where the waste gas stream includes significant amounts of sulfur oxides, the sodium sulfate may be formed in situ in the system by reaction with a suitable sodium ion added to the scrubbing solution.

When sodium sulfate is formed in situ, sodium salt concentrations will gradually build up in the system. In order to avoid this, a portion of the scrubbing solution is continuously withdrawn from the system for further processing. The withdrawn portion may be thermally treated in order to evaporate the aqueous fraction leaving a residue of concentrated sodium and magnesium salts normally in the form of sulfates along with minute concentrations of sulfites and chlorides. By use of a multiple-effect evaporator, the sodium and magnesium salts may be concentrated by fractional crystallization to form a disposable double salt and/or a marketable grade sodium sulfate or "salt cake" by-product.

Typical reactions in the scrubbing zone for the removal of sulfur dioxide and sulfur trioxide from the waste gas and subsequent formation of sodium sulfate are as follows:

$$2H_2O + SO_2 + SO_3 \rightleftharpoons H_2SO_3 + H_2SO_4 \qquad (9)$$

$$2Na_2SO_3 + H_2SO_3 + H_2SO_4 \rightleftharpoons 2NaHSO_3 + 2NaHSO_4 \qquad (10)$$

$$2NaOH + NaHSO_4 + NaHSO_3 \rightleftharpoons Na_2SO_3 + H_2O + Na_2SO_4 \qquad (11)$$

$$Na_2SO_3 + \tfrac{1}{2} O_2 \rightarrow Na_2SO_4 \qquad (12)$$

Suitable sources of the sodium ions in the foregoing reactions include sodium hydroxide, sodium carbonate, sodium bicarbonate and mixtures of the same. If sodium carbonate is added to the system, sodium ions are formed in situ in the following scrubbing liquor polishing reaction analogous to equations (5) through (8):

$$Ca^{++} + Na_2CO_3 \rightarrow CaCO_3 \downarrow + 2Na^- \qquad (13)$$

The calcium ions in the above equation will occur in the effluent liquor from the scrubbing zone at a pH level maintained therein.

Magnesium ions in the scrubbing liquor react with sulphur oxides in the gas stream in the scrubber to form magnesium salts in a manner analogous to the reaction of the sodium ions with the waste gases as set forth above.

Referring to FIG. 3, a system is illustrated in which the waste gas includes significant amounts of sulfur oxides and in which the inert diluent, sodium sulfate, is formed in situ. Otherwise, the system is quite similar to the systems set forth in FIGS. 1 and 2. Therefore, for simplicity of description, common elements will not be set forth in detail.

The apparatus illustrated in FIG. 3 includes a multiple stage scrubber 32 with a wet elbow or prequench section 33 and a gas outlet transition section 34. The scrubber effluent, comprising scrubbing liquor and entrained fly ash, discharges into seal tanks 37a, 37b, and 37c. The effluent from seal tank 37c is delivered to recycle liquor tank 38 and is split into two streams. One stream is directed to the combination mix-delay and main spray liquor tank 39 and combined with the make-up liquor supplied from primary clarifier 40 prior to being recycled to the main spray zone in scrubber 32.

The scrubber effluent streams from seal tanks 37a and 37b are directed into scrubber effluent disposal tank 41. The effluent from the last named tank is passed to primary clarifier 40, whereupon a primary solids-liquid separation occurs. One portion of the overflow liquor from primary clarifier 40 is recycled to the main spray liquor supply tank 39 as make-up liquor for scrubber 32. The remainder of the overflow liquor is directed to prequench spray liquor supply tank 36 for supply to the inlet portion of scrubber 32. As illustrated, the scrubbing solution from supply tank 36 is divided into two streams, one of which is directed to the prequench section 33 of scrubber 32, while the other portion is directed to the main scrubber section.

The underflow from primary clarifier 40, containing partially dewatered fly ash and scrubber liquor effluent, is directed to a first stage countercurrent decantation (CCD) washing thickener 42 for additional concentration of the solids fraction and displacement of the mechanically entrained liquor in a weaker concentration of scrubbing solution from the succeeding stage washing thickener. The overflow from thickener 42 is directed to an alkali mix tank 45 where any residual calcium ions produced in the process are removed from the system by chemical precipitation as set forth above. The underflow from thickener 42 is advanced to the second stage (CCD) washing thickener 43. The underflow from thickener 43 is combined with make-up water additions to the system and the mixture is transferred to an ash pond 44. The overflow from the ash pond is recycled to thickener 43 leaving a deposit of ash pond residue, chemical precipitate, and mechanically entrained liquor, the latter of which constitutes system blowdown liquor. As an alternative to the ash pond 44, a belt filter may be employed in which case the residue is a filter cake residue rather than ash pond residue.

Make-up water from a source 46 and an alkali, such as soda ash, from source 47, are supplied in appropriate quantities to alkali storage tank 48. The soda ash from tank 48 is directed into an alkali mix tank 45 wherein the calcium ions are precipitated to form an insoluble calcium carbonate precipitate as described above.

The alkali from source 47 supplies sodium for reaction with sulfur dioxide and/or sulfur trioxide in the waste gas to form sodium sulfate, a preferred inert diluent of the present invention. After precipitation of calcium carbonate in alkali mix tank 45, the resulting basic liquor is returned via effluent disposal tank 41 for combination with the scrubber effluent liquor therein prior to feeding primary clarifier 40. This step in the process accomplishes three functions, namely, (1) the pH of the scrubber effluent is adjusted according to the acidic compounds formed in the scrubber, (2) sufficient sodium is supplied to react with the sulfur dioxide and/or sulfur trioxide in the waste gas stream to form sodium sulfate in accordance with the foregoing reactions, and (3) the fly ash particles in suspension act as nuclei or seeds for agglomerating the finely mixed calcium carbonate flocs formed in the alkali mix tank 45.

A multiple-effect evaporator 49 is supplied for thermally treating a portion of the stream from supply tank 36. The functions of the evaporator 49 are to bleed off any excess sodium and magnesium salts in the form of sulfates, sulfites, chlorides, etc. which are formed in the system and to prevent excessive accumulations of soluble salts in the scrubbing liquor circuit. Low pressure steam from source 50a is supplied to the evaporator and withdrawn as condensate 50b. Water vapor is vented from the evaporator while concentrated sodium sulfate and magnesium sulfate are withdrawn in crystal form from the same. A small recycle stream from evaporator 49 is returned to disposal tank 41.

Briefly described, the above apparatus operates as follows. The gas stream containing fly ash and other gaseous contaminants, including sulfur dioxide and/or sulfur trioxide, enters scrubber 32 through prequench section 33 wherein it is prehumidified and reduced to adiabatic saturation temperature levels prior to entering the main spray section 32 of the scrubber. The sodium ion supplied from source 47 reacts with the sulfur dioxide and/or sulfur trioxide as set forth above to form the inert diluent, sodium sulfate which in turn impedes the dissolution of the scale-producing alkaline earth, silica and clay minerals in the fly ash.

A further disclosure of the nature of the present invention is provided by the following specific examples of the practice of the invention. It should be understood that the data disclosed serve only as examples and are not intended to limit the scope of the invention.

EXAMPLE 1

An example of the operation of the apparatus depicted in FIG. 1 is as follows. The gas entering the wet scrubber is untreated flue gas from a 478 MW low sulfur pulverized coal fired steam generator at a volume of 1,975,000 ACFM and a temperature of 254° F. Scrubber 13 is supplied with a liquor recycle stream from recycle liquor tank 16 (8100 gpm) and with another stream (16,200 gpm) from the main spray liquor tank 17. After evaporating 430 gpm in the scrubber all of the scrubber effluent liquor stream (15,770 gpm) from seal tank 14a is directed to the effluent disposal tank 18 and combined with the make-up liquor (850 gpm) from the alkali mix tank to form 16,620 gpm of slurry influent to clarifier 19. The clarifier overflow (16,200 gpm) is directed to the main spray liquor tank 17.

The clarifier under-flow (420 gpm) is combined with the second stage thickener 22 overflow (555 gpm) liquor and directed to the first stage thickener 20. The thickener 20 overflow (816 gpm) is directed to the alkali mix tank 21 and the underflow (159 gpm) is directed to the second stage thickener 22 and combined with 555 gpm of recycle liquor from the ash pond 25 overflow. Water (423 gpm) is directed to the ash pond to dilute 159 gpm of underflow from the second stage thickener 22. The liquor (27 gpm) mechanically entrained in 636 tons per day of fly ash contains 0.5 tons per day of sodium sulfate at a concentration of 0.31% by weight. This liquor stream, included as ash pond residue, constitutes the scrubbing system blowdown and is limited to 0.2% or less of the total scrubbing liquor inventory.

The make-up streams are as follows:
a. $Na_2CO_3$ to Alkali Mix Tank — 20.7 tons per day
b. Water to Alkali Storage Tank and Ash Pond — 457 gpm c. Sodium Sulfate to Alkali Storage Tank — 0.5 tons per day

EXAMPLE 2

This example describes the operation of the system and apparatus depicted in FIG. 2. Those streams flowing at the rate set forth in Example 1 will not be repeated. The major difference is that in the absence of CCD thickeners 20 and 22, 6.25 tons/day of sodium sulfate are lost as mechanically entrained liquor in the fly ash residue and must be replenished by equivalent make-up additions of sodium sulfate to alkali storage tank 29. This is in contrast to the 0.5 tons/day of sodium sulfate lost and replenished in FIG. 1.

The process and apparatus described above have a number of advantages over prior scrubbing processes and apparatuses not employing the use of an inert diluent in a pH controlled scrubbing liquor circuit. As a result, the dissolution rates of the alkaline earth, silica and clay minerals in the ash are greatly impeded to the extent that the amount of such scale-producing compounds as $Ca(OH)_2$, $CaSO_3$ and $CaSO_4$ accumulating in the scrubbing liquor circuit can be limited and controlled to a level where any residual calcium ions are removable from the system by viable chemical treatment methods. By impeding the dissolution rates of all scale-producing compounds present in the fly ash while still maintaining calcium ion concentrations in the scrubbing liquor inventory well below the point of saturation, a "closed-loop" mode of operation becomes a reality to the extent that the system blowdown rate is equivalent to the amount of scrubbing liquor mechanically entrained in the ash pond residue. By the same token, make-up water additions to the system are adjusted according to the water evaporated in the scrubber and to the water entrained in the fly ash residue as system blowdown liquor.

EXAMPLE 3

An example of the operation of the apparatus depicted in FIG. 3 is as follows. The gas entering the wet scrubber is at a volume of 1,975,000 ACFM and a temperature of 254° F and includes sulfur dioxide and fly ash. Prequench section 33 of scrubber 32 is supplied with scrubbing solution (2,673 gpm) at 25 psig from supply tank 36. The main body of scrubber 32 is supplied with scrubbing solution; (5,427 gpm) at 25 psig from supply tank 36 and (16,200 gpm) at 200 psig from main spray liquor supply tank 39. This latter stream includes 7.78% sodium sulfate and sodium sulfite and 4.06% magnesium sulfate and magnesium sulfite. A volume of 1,723,640 ACFM leaves the scrubber at 130° F.

Scrubber effluent from seal tank 37a (2243 gpm) and from seal tank 37b (13,527 gpm) are directed to scrubber effluent disposal tank 41. Scrubbing liquor (8100 gpm) from seal tank 37b is directed to recycle liquor tank 38 and thence to tank 41. A minor stream (3 gpm) is also directed to tank 41 from evaporator 49. The total effluent from tank 41 (16,681 gpm) at a pH of less than 6.0 provides the slurry influent to primary clarifier 40. One portion of the overflow (8161 gpm) from primary clarifier 40 is directed to prequench spray liquor supply tank 36 for recycling to the scrubber as set forth above. The other portion of the overflow (8100 gpm) is directed to supply tank 39 and combined with the stream from recycle liquor tank 38 to form the aforementioned main spray liquor supply source for the scrubber.

The underflow from clarifier 40 (420 gpm) at 25% solids content is combined with the overflow (613 gpm) from the second stage thickener 43 and directed to first stage thickener 42. The overflow (874 gpm) from thickener 42 is directed to the alkali mix tank 45 while the underflow (159 gpm) is directed to the second stage thickener 43 and combined with recycle liquor (613 gpm) from the overflow of ash pond 44. Make-up water (481 gpm) is directed to the ash pond to dilute the underflow (159 gpm) and 40% solids content from thickener 43. Liquor (27 gpm) mechanically entrained in 636 tons per day of fly ash removed from ash pond 44 contains 2615 ppm of combined sodium sulfate and sodium sulfite and 1365 ppm of combined magnesium sulfate and magnesium sulfite.

Make-up water (34 gpm) is supplied to alkali storage tank 47 together with 20.5 tons per day make-up sodium carbonate. The alkali solution (33 gpm) is directed to alkali mix tank 45 wherein it is combined with the overflow (874 gpm) from thickener 42 to form a sodium ion containing alkali stream (908 gpm) at pH 8-9 which is supplied to effluent disposal tank 41.

Low pressure steam (15 – 20 psig) is supplied to multiple-effect evaporator 49. A portion of the recycle to the scrubber (61 gpm) is supplied to the evaporator from which water vapor (58 gpm) and crystals of sodium sulfate (30.5 tons per day) and magnesium sulfate (15.9 tons per day) are removed.

In the above system, 33.32 tons per day of sulfur dioxide are removed from the inlet gas. The following fly ash minerals are dissolved in the scrubbing liquor; 10.18 tons per day calcium oxide and 5.40 tons per day magnesium oxide.

What is claimed is:

1. In the process of removing fly ash particulates suspended in a flue gas stream utilizing at least one wet scrubber in a closed-loop system, the steps of
    a. contacting the gas stream in a scrubbing zone of the scrubber with an aqueous scrubbing solution to wet and collect the fly ash, said scrubbing solution containing an inert diluent comprising a soluble alkali metal salt having an anion which is unreactive with sulfur oxides,
    b. removing said contacted scrubbing solution from the scrubbing zone at a pH level of at least 6.0,
    c. separating the entrained fly ash from the scrubber effluent solution and disposing of the separated fly ash, and
    d. recycling the separated scrubbing solution and inert diluent as a make-up solution to the scrubbing zone.
2. A process as in claim 1 in which the metal ion of the inert diluent comprises sodium.
3. A process as in claim 2 in which the metal ion of the inert diluent also comprises magnesium.
4. A process as in claim 1 in which the inert diluent also comprises sodium sulfate.
5. A process as in claim 4 in which the inert diluent also comprises magnesium sulfate.
6. A process as in claim 5 in which the flue gas stream includes sulfur dioxide, sodium ion is added to the scrubbing solution, and said sodium ion and sulfur dioxide react to form a material selected from the group consisting of sodium sulfite, sodium sulfate, and mixtures thereof.

7. A process as in claim 6 in which a portion of the separated scrubbing solution is withdrawn prior to recycling in step (d) to prevent excessive build-up of sodium and magnesium salts in the scrubbing solution.

8. A process as in claim 7 in which the withdrawn scrubbing solution is heated in an evaporator circuit to evaporate the aqueous fraction to recover sodium and magnesium salts in crystal form.

9. A process as in claim 7 in which the system blowdown is essentially equal to the scrubbing solution mechanically entrained in the separated fly ash together with the metallic salts and water removed in the evaporator circuit.

10. A process as in claim 6 in which said added sodium ion is in a form selected from the group consisting of sodium hydroxide, sodium carbonate, sodium bicarbonate and mixtures thereof.

11. A process as in claim 1 in which the strength of the alkali metal salt in the scrubbing liquor varies between 0.1% and 30.0% by weight of the scrubbing solution in the scrubbing zone.

12. A process as in claim 1 in which the dissolution rates of scale-producing constituents in the fly ash comprising alkaline earth, silica and clay minerals are depressed sufficiently to an extent that scaling does not occur in the scrubber.

13. A process as in claim 1 in which the collected fly ash fraction is subjected to displacement washing counter-currently in a system of clarifiers and washing thickeners thereby conserving the inert diluent in the scrubbing solution and reducing the total dissolved solids levels in the ash pond residue.

14. A process as in claim 1 in which less than 2.0% by weight of the total scrubbing solution in the system is removed as blowdown liquor.

* * * * *